United States Patent
Gallagher et al.

(10) Patent No.: US 8,036,370 B2
(45) Date of Patent: Oct. 11, 2011

(54) DIRECTLY CONTACTABLE CALL CENTER AGENTS

(75) Inventors: Kevin Gallagher, Galway (IE); Shane McCarron, Kinlough (IE); Thomas O'Rourke, Galway (IE); Patrick Hession, Galway (IE)

(73) Assignee: Avaya, Inc., Basking Ridge, NJ (US)

( * ) Notice: Subject to any disclaimer, the term of this patent is extended or adjusted under 35 U.S.C. 154(b) by 906 days.

(21) Appl. No.: 10/732,645

(22) Filed: Dec. 10, 2003

(65) Prior Publication Data
US 2005/0129211 A1    Jun. 16, 2005

(51) Int. Cl.
*H04M 3/00* (2006.01)
*H04M 5/00* (2006.01)
(52) U.S. Cl. .............. 379/265.02; 379/265.05
(58) Field of Classification Search .......... 379/265.02, 379/265.05, 266.01
See application file for complete search history.

(56) References Cited

U.S. PATENT DOCUMENTS

| | | | |
|---|---|---|---|
| 5,867,562 A * | 2/1999 | Scherer | 379/88.21 |
| 6,064,730 A * | 5/2000 | Ginsberg | 379/265.09 |
| 6,704,396 B2 * | 3/2004 | Parolkar et al. | 379/88.17 |
| 6,731,630 B1 * | 5/2004 | Schuster et al. | 370/356 |
| 6,937,563 B2 * | 8/2005 | Preston et al. | 370/230 |
| 6,978,247 B1 * | 12/2005 | Bogart et al. | 705/8 |
| 2002/0154757 A1 * | 10/2002 | Hack | 379/265.01 |
| 2006/0098621 A1 * | 5/2006 | Plata Andres et al. | 370/352 |

* cited by examiner

*Primary Examiner* — Rasha S Al Aubaidi
(74) *Attorney, Agent, or Firm* — Barnes & Thornburg LLP

(57) ABSTRACT

Contact centers typically have an entry process to receive incoming contacts and distribute those appropriately amongst agents associated with the contact center. This entry process is often complex and time consuming. This invention allows users of the contact centre to reach a particular agent without undergoing the entry process. This is achieved without compromising security or giving away details about the agents.

14 Claims, 3 Drawing Sheets

DIRECTLY CONTACTABLE CALL CENTER AGENTS

FIELD OF THE INVENTION

The present invention relates to contact centers. The invention is particularly related to, but in no way limited to, a method and apparatus for enabling an end user to send a contact to a selected contact center agent whilst bypassing at least part of an entry process for that contact center.

BACKGROUND TO THE INVENTION

Call centers are known in which incoming calls are routed to one of a plurality of agents. For example, the call center might provide help desk facilities for a particular group of products. Customers are able to call in and be allocated to an agent who has the necessary skills to deal with the customer's query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

The terms "call center" and "contact center" as used herein are not intended to be restricted to situations in which telephone calls are made to the center. Other types of call or contact are also envisaged, such as email, fax, SMS, chat, web access, video access and any other suitable method of contact including conventional telephone calls and voice over internet protocol telephone calls. Similarly, the terms "call" and "contact" as used herein are not intended to be restricted to conventional telephone calls but include contacts made by email, fax, voice over IP and any other suitable medium.

Typically a call screening or filtering process is used to find out what type of treatment is required for an incoming contact. As mentioned above this often involves use of an interactive voice response system to determine which skill set is most appropriate for the incoming contact and/or to allocate a priority level to the incoming contact. This screening or filtering process is lengthy, especially for contact centres having many skill sets, operating for many different media types of contact and offering different priority levels or levels of service to customers. In such situations there is a need to allow users of the contact centre to reach a particular agent without undergoing the screening or filtering process. For example, if a customer needs to communicate with a particular agent repeatedly about the same issue.

Previously this problem has been addressed in three main ways all of which have shortcomings as now described. A first method has involved using identifiers to keep track of all incoming contacts relating to a particular issue. For example, consider a customer who contacts a contact centre to request technical information about a product before deciding whether to purchase that product. The customer obtains the information and needs to return to the contact centre later after having checked that the product will meet his or her requirements. During the initial interaction with the contact centre a unique identifier is allocated to the case and details about that identifier, the customer, the agent handling the case and the initial interaction are stored in a database accessible by the contact centre. When the customer returns to the contact centre, he or she is prompted to give the identifier during the screening or filtering process. The contact centre accesses details about the case from the database using the unique identifier and directs the customer to the same agent who previously dealt with the matter. However, this method is complex and involves the use of a database accessible to the contact centre. In addition, the customer must still undergo the screening or filtering process at least in part and needs to remember the unique identifier provided.

A second method has involved trying to identify the customer by the address from which the contact originates. For example, this address may be the telephone number of the terminal used by the customer or the internet address of that terminal. If the contact centre is able to obtain this information it is able to determine whether an incoming contact is from a customer who has recently contacted the centre. If so, details of that previous interaction can be accessed from a database and used to decide how to treat the incoming contact. However, there are many situations in which information about the address from which the customer contact originates is not available. For example, if the customer is calling from within a private network that only exposes a generic address. Also, if the customer contacts the centre from different addresses at different times, this method will not work. Another drawback is that, using this method, the contact centre is unable to determine whether the incoming contact is related to the same issue as previously raised by the customer, or whether it relates to a new matter.

A third method has involved individual agents at the call centre giving customers direct contact details for particular agent stations in the contact centre. This method has been employed, often in time critical situations, in which customers need to contact a particular agent quickly and directly without undergoing the screening or filtering process to access the contact centre. However, this method exposes details of the internal agent stations to customers or other users of the contact centre. This is disadvantageous from a security point of view and also because the customers or end users concerned are then able to continue bypassing the normal access system to the contact centre. This is problematic, because administrative control of the contact centre is compromised. For example, a particular strategy for workload allocation between agents at the contact centre may be implemented by the screening and filtering process. If customers are able to bypass that process then the workload allocation breaks down.

OBJECT TO THE INVENTION

The invention seeks to provide an improved method and apparatus for enabling an end user to send a contact to a selected contact center agent whilst bypassing at least part of an entry process for that contact center. The invention seeks to overcome or at least mitigate one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

Contact centers typically have an entry process to receive incoming contacts and distribute those appropriately amongst agents associated with the contact center. This entry process is often complex and time consuming, especially for contact centres having many skill sets, operating for many different media types of contact and offering different priority levels or levels of service to customers. In such situations there is a need to allow users of the contact centre to reach a particular agent without undergoing the entry process. The present invention achieves this without compromising security and giving away details about the agents. A unique identifier for a selected agent is formed, without using details about the actual agent in the identifier. The unique identifier is associated with the selected agent, for example, using a registration process. The customer or end user is then provided with the unique identifier and can use that to contact the selected agent directly, i.e. by bypassing the normal entry process for the contact center. In this way the customer has no details of the agent's actual address or other details and security of the contact center is maintained. The association between the unique identifier and the agent is cancelled when pre-specified conditions are met for example, after a time delay, after a request from the agent, or when a particular transaction with the customer is completed. The customer must then use the normal entry system to the contact center.

According to an aspect of the invention there is provided a method for use in a contact center. The contact center comprises a plurality of agents and an entry processor arranged to receive contacts and subject them to an entry process such that they are distributed amongst the agents. The method enables an end user to send a contact to a selected one of the agents whilst bypassing at least part of said entry process. The method comprises the steps of:
    accessing a unique identifier comprising no information about the selected agent;
    associating the unique identifier with the selected agent;
    providing the end user with information about the unique identifier such that the end user is able to send a contact to the selected agent whilst bypassing at least part of said entry process.

This provides the advantage that the customer or end user is able to bypass the normal entry process and reach the agent quickly and directly. Because the unique identifier contains no information about the selected agent details of the agent do not need to be disclosed to the customer. This improves security of the contact center. By associating the unique identifier with the selected agent that identifier can be used effectively to allow contacts from the customer to be directed straight to the agent, without the need for those contacts to be processed using the contact center entry system.

Preferably the method further comprises cancelling the association between the unique identifier and the selected agent in the event that one or more pre-specified conditions are met. For example, these pre-specified conditions may involve a request from the agent, a time delay or the end of a particular transaction between a customer and the agent. By cancelling the association between the unique identifier and the agent the customer is then forced to use the normal entry system to the contact center. This reduces the ability of the end user or customer to use the unique identifier inappropriately and gives the contact center some control over when unique identifiers may be used by end users.

Preferably the unique identifier is an address such as a session initiation protocol (SIP) address of record. The step of associating the unique identifier with the selected agent preferably comprises making a registration at a registration server. This provides the advantage that details of the actual agent can be hidden from the end user or customer who is only provided with details of the unique identifier.

In another example the unique identifier is associated not only with the selected agent but also with a transaction identifier. For example, the unique identifier is generated by using a transaction identifier that has been allocated to a particular contact in the contact center. This is particularly advantageous because such transaction identifiers, when used in contact centers, are unique in order that each different transaction can be distinguished. By using these it is then possible to generate a unique identifier for associating with an agent in a simple, quick and effective manner. In addition, if it is required to enable a customer to reach an agent directly, but only for the duration of a particular transaction, that process is facilitated by using the transaction identifier as part of the unique identifier. Thus, in a preferred example, the method further comprises receiving a contact at the contact center; identifying an agent to handle the contact, that agent being the selected agent; and assigning a transaction identifier to the incoming contact.

According to another aspect of the invention there is provided a contact center comprising:
    an entry processor arranged to receive contacts and subject them to an entry process such that they are distributed amongst a plurality of agents;
    an input for accessing a unique identifier comprising no information about the selected agent;
    an output arranged to issue instructions to associate the unique identifier with a selected one of the agents;
    an output arranged to provide an end user with information about the unique identifier; such that the end user is able to send a contact to the selected agent whilst bypassing at least part of said entry process.

Preferably the contact center is session initiation protocol (SIP) enabled. This provides the advantage that the unique identifier can be a SIP address of record that can be created quickly and simply and which is in effect "disposable". The instructions to associate the unique identifier and the selected agent preferably comprise instructions to make a registration at a registration server. For example, this can be a SIP registration server. In this way, details of the actual selected agent are hidden from the customer who only receives details of the unique identifier. Despite this, the customer is still able to use the unique identifier to contact the selected agent directly without going through the normal contact center entry system.

The invention also encompasses a communications network comprising a contact center as described above.

According to another aspect of the invention there is provided a computer program arranged to control a contact center, said contact center comprising an entry processor arranged to receive contacts and subject them to an entry process such that they are distributed amongst a plurality of agents, the computer program being arranged to control the contact center such that:
    a unique identifier is accessed comprising no information about the selected agent;
    instructions are issued to associate the unique identifier with a selected one of the agents; and
    an end user is provided with information about the unique identifier; such that the end user is able to send a contact to the selected agent whilst bypassing at least part of said entry process.

The invention also encompasses a session initiation protocol (SIP) address of record suitable for associating with an agent of a session initiation protocol enabled contact center, said address of record comprising a transaction identifier for a transaction at the contact center, said agent being a party to that transaction.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
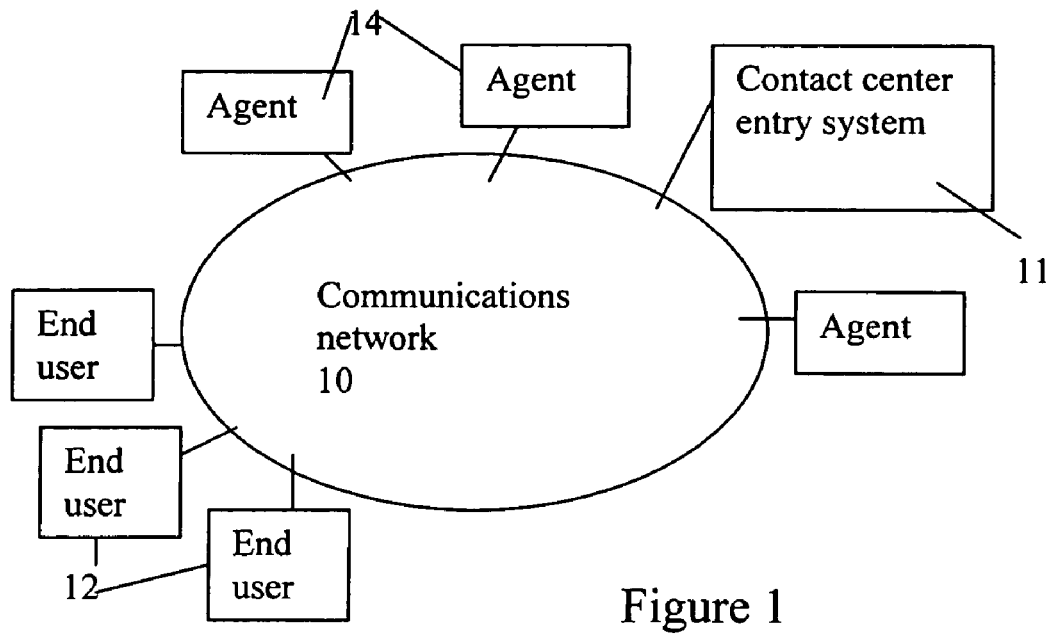
FIG. 1 is a schematic diagram of a contact center in a communications network suitable for use with the present invention.

FIG. 1 is a schematic diagram of a contact center in a communications network 10. The contact center comprises an entry system 11 and a plurality of associated agents 14 who have terminals connected to the communications network 10. End users 12 or customers also have access to the communications network 10.

The end users are able to send contacts to the contact center and these are processed by the entry system 11 and directed by the contact center to an agent or a queue for that agent. The entry system 11 comprises any suitable means for treating the incoming contacts. For example, a music-on-hold system, a recorded announcement system or an interactive voice response system. Other possibilities include a system for providing automated instant messaging (IM) responses, a system for providing streaming video responses or a system for providing responses using a web push or web collaboration system. Automated responses can be provided to the end users using any suitable media type including media types different from that used by the end user in sending the incoming contact. The contact center selects a suitable agent or skill-set for handling the incoming contact using any suitable method as known to the skilled person. For example, this is done using information about the agents currently available and information about the incoming contact.

As mentioned above, processing of an incoming contact by the entry system 11 is typically time consuming and often complex for the end user 12. The present invention enables an end user to bypass all or at least some of the entry system 11 and contact an appropriate agent 14 directly. This is achieved in a way that does not compromise the security of the contact center by giving the end user details of the actual agents 14.

Figure 2:
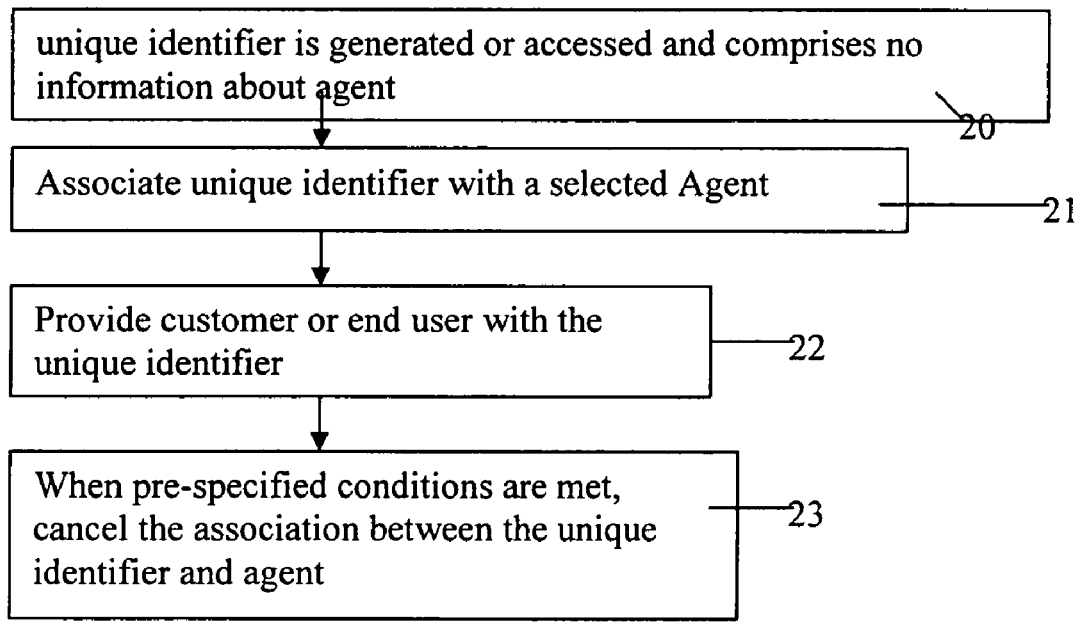
FIG. 2 is a flow diagram of a method of enabling an end user to contact a contact center agent.

With reference to FIG. 2, a unique identifier is generated or accessed by the contact center (see box 20 of FIG. 2). This comprises no information about agents 14 of the contact center. The unique identifier is then associated with a selected agent 14 (see box 21 of FIG. 2) and the customer or end user 12 is provided with the unique identifier (see box 22 of FIG. 2). The end user 12 is then able to use this unique identifier to send a contact directly to the selected agent 14 without using the contact center entry system 11.

The process of accessing or forming the unique identifier and associating it with a selected agent 14 is dynamic in that it is carried out as and when needed. The contact center has access to information about when and for how long contacts are made using the unique identifier. For example, this is achieved by enabling the contact center to track the state of the selected agent 14 associated with the unique identifier. The contact center is also able to control communication sessions between the selected agent and a customer, where that customer has used the unique identifier to contact the agent directly. For example, in that case, the customer may issue a contact direct to the agent but the agent may be already occupied on another call. In that case, the contact center is able to retrieve the contact issued by the customer and apply any appropriate treatment to that contact such as a recorded announcement.

Thus even though the customer is able to use the unique identifier to contact the agent directly, bypassing the contact center entry system, the contact center is still aware of such contacts. For example, the contact center is able to determine in real time that the agent has received a direct contact and is able to track and report on the resulting communication session between the customer and agent. In the case that a transaction identifier is used to form the unique identifier (see below) the contact center is also able to identify, based on the transaction ID the full reporting history of the customer to agent interaction.

The process of associating the unique identifier with the selected agent is done in such a manner that details of the selected agent are hidden from the end user 12. This improves the security of the contact center.

In a preferred example, the association between the unique identifier and the agent is cancelled when pre-specified conditions are met (see box 23 of FIG. 2). For example, this cancellation can occur automatically when a time-out expires or at the instigation of the agent, customer, or contact center supervisor. In another example, the cancellation occurs automatically when a transaction between the end user and the contact center comes to an end. By cancelling the association in this way the end user is unable to go on using the unique identifier to directly contact the agent.

It is possible for the contact center itself to proactively initiate contacts. In that case the contact center can select an appropriate agent, form the unique identifier and send those to the end user. The end user is then free to contact an agent at the contact center directly without having to go through the normal entry system. For example, consider a situation where the contact center needs to inform a customer that his or her flight has been cancelled. Information about this can be sent to the customer together with a unique identifier that enables the customer to directly reach an agent and book a new flight.

In other situations, the customer initiates a contact to the contact center. This is discussed further with reference to FIG. 3. In this case the contact center receives the incoming contact (see box 30), processes it using the entry system (see box 31) and selects an agent to handle the contact (see box 32). Optionally at this stage the contact center assigns a transaction identifier to the contact as known in the art. Information about the contact and the transaction identifier are stored in a database accessible to the contact center and this enables the contact center to keep track of all contacts and agent responses associated with the same transaction.

The contact center then accesses or generates a unique identifier, associates this with the selected agent, and informs the customer of the unique identifier. The customer is then able to contact the selected agent directly until the association is cancelled. This is illustrated schematically in boxes 32 to 36 of FIG. 3.

Figure 3:
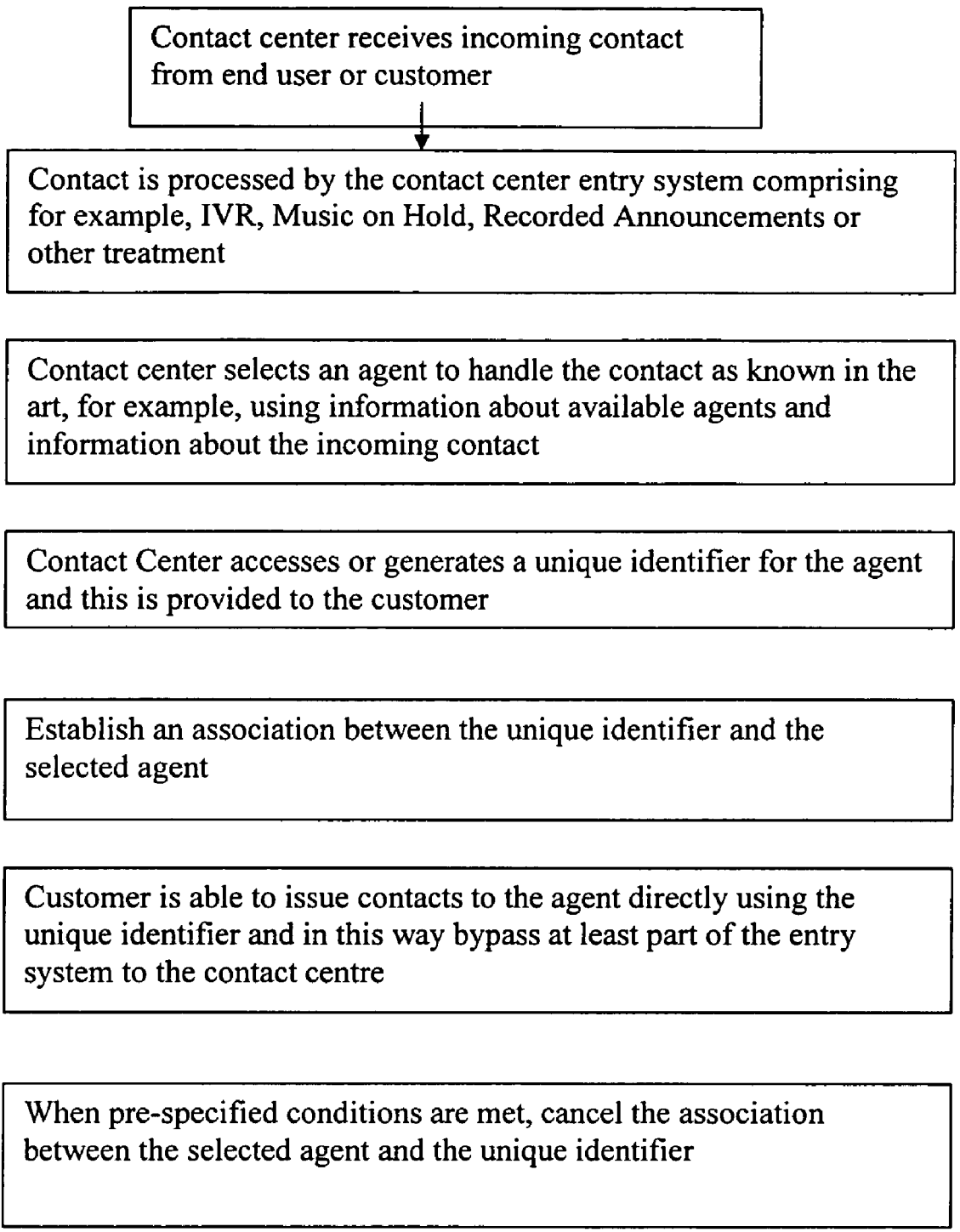
FIG. 3 is a flow diagram of another method of enabling an end user to contact a contact center agent.

In a preferred example, the contact center assigns a transaction identifier to the incoming contact (box 32 of FIG. 3). This transaction identifier is unique in that it is able to distinguish the transaction from any other transaction handled by the contact center. Therefore in one example, the transaction identifier is used by the contact center to generate the unique identifier of the present invention.

Any suitable type of contact center may be used as known in the art. One particular embodiment of the invention is now described with reference to a session initiation protocol (SIP) enabled contact center, although the invention is not limited to this type of contact center.

As known in the art, SIP is a protocol that can be used to set up communication sessions over a packet data network where those communication sessions are for voice, video, instant messaging (IM) or other suitable media. This is often referred to as "voice over internet protocol" (VOIP) although the communication sessions are not limited to voice. A SIP enabled contact center is thus able to handle contacts received over a SIP data network and these may be of many different media types. SIP is defined in IETF RFC 3261, and other relevant SIP related IETF RFCs.

Figure 4:
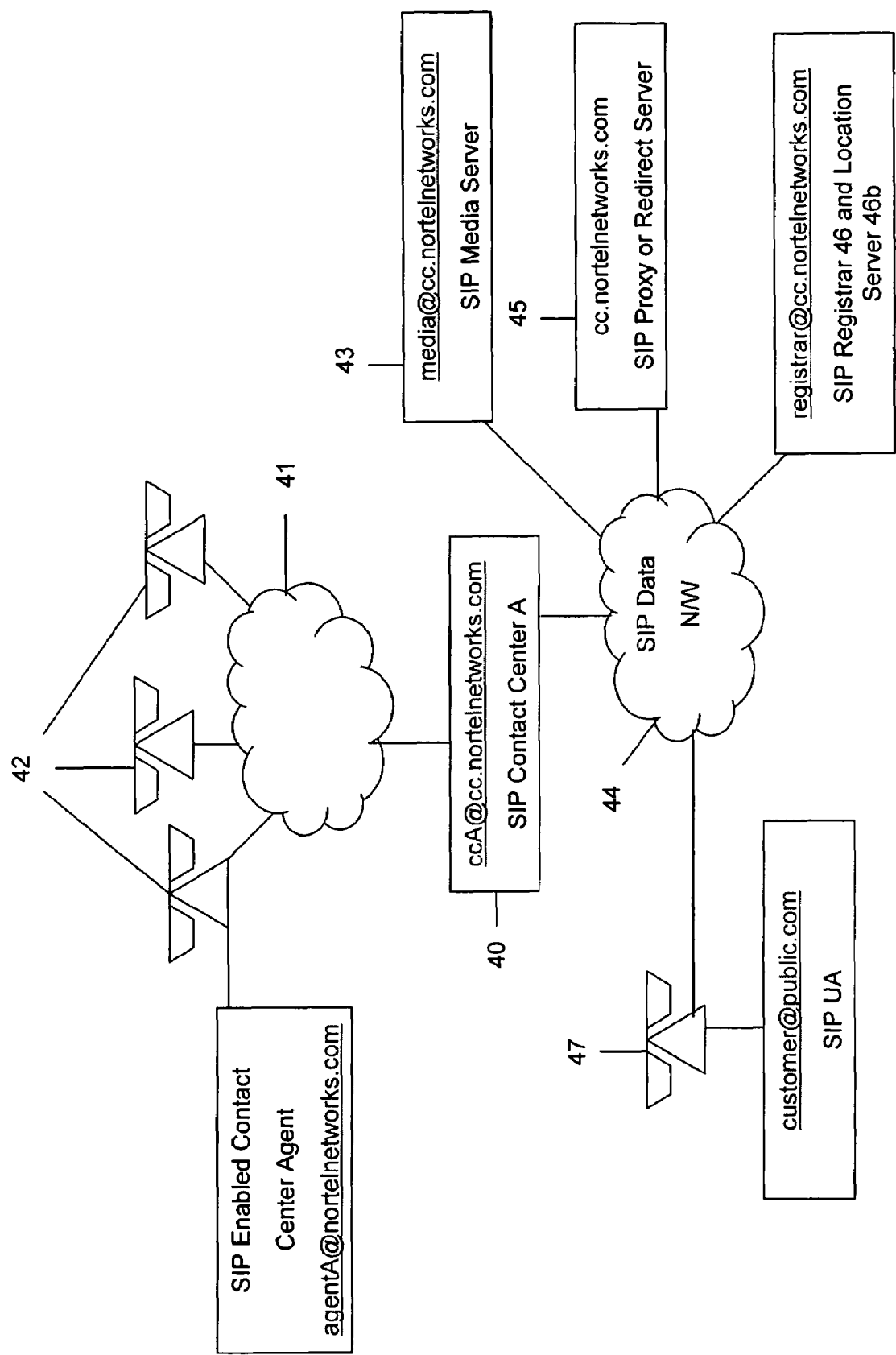
FIG. 4 is a schematic diagram of a session initiation protocol (SIP) enabled contact center in a communications network.

FIG. 4 is a schematic diagram of a SIP enabled contact center in a communications network. The contact center comprises a server 40 connected via a SIP data communications network 41 to a plurality of SIP enabled agent terminals 42. The communications network 41 can be an enterprise network that is connected to another data network 44 such as the Internet or a company-wide Intranet. The enterprise network 41 may be private with respect to the other data network 44 and in that case network address translators are used as known in the art. That is, for reasons of clarity, only those components of the SIP contact center and networks needed for explaining the invention are shown in FIG. 4. Other components are used as known to the skilled person in the art.

The contact center server 40 acts to receive contacts from end users 47 connected to it via the SIP data network 44. These contacts are distributed to appropriate agents 42 by the entry system of the contact center server 40. The contact center optionally also comprises a SIP media server 43 which is used to provide additional functionality for the contact center entry system. For example, this can be music-on-hold, recorded announcements or interactive voice response as known in the art. In FIG. 4 the media server 43 is shown as a physical block being a separate entity from the contact center server 40. However, this is not essential. A single server configuration can also be used in which the media server, contact center entry system, contact center server, SIP registrar and SIP proxy are provided using a single server. Thus the media server 43 as represented in FIG. 4 is either a physical or logical block.

The SIP data network also comprises a SIP proxy or redirect server 45 and a SIP registration and location server 46 as known in the art. Although only one of each of these items is illustrated others may be present in the data network 44. It is not essential for the SIP registration and location server to be provided at the same entity, these items may be separate as known in the art.

As mentioned above SIP is defined in IETF RFC 3261 and other RFCs and comprises various different types of entity including SIP endpoints, SIP registrars, SIP location servers and SIP proxy or redirect servers. The way in which these entities are applied in the present embodiment is now described.

SIP Endpoints

SIP endpoints for the purposes of this embodiment are considered as intelligent stateful entities consisting of a SIP UAC (Client) and SIP UAS (Server). SIP endpoints can terminate or originate SIP sessions which can contain user to user information (e.g. Instant Messaging) or negotiation messaging to set up other parallel information streams (e.g. SDP). They can also terminate or originate Voice, Video or other multimedia messaging streams or redirect these streams to other entities as negotiated potentially via the Session Description Protocol (SDP) information transported over SIP. SDP is variously covered by RFC3264 and RFC2327.

In this embodiment SIP endpoints REGISTER their location as per RFC3261 with a SIP Registrar 46 and have an identified Proxy 45 or redirect server through which SIP sessions are passed for Address Resolution and other such functions.

SIP endpoint types for this architecture include: SIP Clients (the Contact Center Agent User Interface 42); SIP Media Server 43 (the media and treatment response entity) the SIP contact center server 40, and the customer's endpoint or terminal 47. However, as mentioned above it is not essential for the invention to be implemented using SIP.

SIP Registrar 46

The SIP Registrar 46 is an entity to which the SIP endpoints send REGISTER messages to identify their current location in the data network 44. Generally the SIP Registrar 46 stores data in the location server (or is one and the same as the location server 46b as illustrated in FIG. 4). A further requirement of the SIP Registrar is generally to provide authentication services for the SIP user 47 (confirm user is configured and validates user password). Various authentication services are common including HTTP Digest (RFC2069 and RFC2617).

As explained in RFC3261 a register request can be used to add, remove and query bindings. In the present embodiment, these bindings are used to form an association between the selected agent and the unique identifier given to the end user. A register request can be used to add a binding between one or more contact addresses and an address of record. A "SIP address of record" (AOR), as defined in RFC3261, is a SIP or SIP Universal Resource Indicator (URI) that points to a domain with a location service that can map the URI to another URI where the user might be available. Typically, the location service is populated through registrations. An AOR is frequently thought of as the "public address" of the user.

This registration process can be performed by a suitably authorised third party on behalf of a particular address of record. In the embodiment being described, the suitably authorised third party is the contact center server 40. It is also possible for a SIP client to remove existing bindings or query to find out which bindings currently exist for an address of record.

SIP Location Server 46b

The location server 46b stores information that assists in resolving a User's Address of Record URI to an actual location that a User is currently Registered at. A SIP proxy or redirect server is able to input a URI to the location server and obtain details of any associated URIs to which to send a request. The information accessible to the location server is either obtained as a result of registrations made at the Registration Server or may be mapping functions configured at the direction of an administrator.

SIP Proxy or Redirect Server 45

This provides redirect or forwarding services for SIP sessions. If entity A wishes to initiate a session with entity B it can use SIP Proxies to resolve the location of the endpoint and move the request "closer" to entity B until such time as the Proxy nearest entity B presents the session directly to it.

Dynamic Creation of SIP Address of Record

In the embodiment described with reference to FIG. 4 the unique identifier is preferably a SIP address of record. As mentioned above it is optionally created by using a transaction identifier also referred to as a "trouble ticket number". Thus in one embodiment the SIP address of record takes a format incorporating the trouble ticket number and the domain name within which the application creating the SIP address of record resides. For example, that application can be the contact center server 40 or the agent terminal 42.

An example of a format for the SIP address of record, which is an embodiment of the unique identifier referred to above, is then:

SIP:
Ticket123451022003200823@cc.nortelnetworks.com

The address of record also conforms to the addressing requirements mandated in IETF RFC 3261 section 19.1.

The contact center server 40 or agent terminal 42 creates the unique identifer dynamically using one of the methods now described or any other suitable method. Note that IETF RFC 3261 does not mandate how a SIP address of record is to be created and so any suitable method can be used. It is also possible for the unique identifier to be created by the entity that creates the trouble ticket. For example, that entity may be indepdent of the contact center server 40.

One possible method of creating the SIP address of record involves an extension to the SIP registration mechanism. In this case, the SIP Register request is arranged to simultaneously be a request to the Registrar to add the SIP URI in the relevant database (for example, the Location server) as well as to add the Registration Contact details to that Address of Record for the purposes of routing. Whichever entity creates the SIP address of record by this method does so by obtaining the trouble ticket number, or any other suitable unique number and combining this with the domain name of the contact center server to form a URI.

As mentioned above IETF RFC 3261 supports the ability for third parties to Register endpoints against Address of Records provided the Registrar can authenticate their ability to do so. In this embodiment the Registrar is also arranged to authenticate the third party's ability to dynamically create Address of Records as well as to Register endpoints against that Address of Record.

Another way in which SIP address of records can be dynamically created involves automatic creation of a SIP URI within a specified User Database, such as the location server 46, using non-SIP means. The contact center server 40 or any other suitable entity can be arranged to automatically create a SIP URI for example, at the same time as a trouble ticket number is allocated. The non-SIP means can be lightweight directory access protocol (LDAP) or web services for example. Another possibility is for the SIP URI to be created manually.

The Registration Process

Once the unique identifier has been created it is next associated with the selected agent. As mentioned above, this is achieved in one embodiment by dynamically registering the unique identifier against the selected agent at a SIP Registrar 46. Dynamic registration is one way of achieving the association between the unique identifier and the selected agent; others are possible.

In order to register Agent A at the Registrar in respect of the following unique identifier the following SIP Register message is used.
Ticket12345abcde10122003200823@cc.nortelnetworks.com REGISTER sip:cc.nortelnetworks.com SIP/2.0
Via: SIP/2.0/UDP cc.nortelnetworks.com:5060; branch=z9hG4bK87asdks
Max-Forwards:70
To:
    Ticket12345abced10122003200823@cc.nortelnetworks.com
From: ccA<sip: ccA@cc.nortelnetworks.com>;tag=456248
Call-ID: 843817637684230@998sdasdh09
CSeq: 1826 REGISTER
Contact: <sip:AgentA@cc.nortelnetworks.com>; Expires=7200
Content-Length: 0

An example of a particular end-to-end call flow is now given. This is for a situation in which end user 47 (see FIG. 4) at a SIP enabled terminal of SIP address customer@Public.com sends a contact to the Contact Center server 40 by calling service@cc.nortelnetworks.com.

An example SIP INVITE message received at the contact center server 40 is then as follows:

INVITE sip:service@cc.nortelnetworks.com SIP/2.0
Via: SIP/2.0/UDP public.com;branch=z9hG4bKnashds8
Max-Forwards: 70
To: service<sip: service@cc.nortelnetworks.com>
From: customer<sip: customer@public.com>; tag=1928301774
Call-ID: a84b4c76e66710
CSeq: 314159 INVITE
Contact: <sip:customer@public.com>
Content-Type: application/sdp
Content-Length: 142

A SIP application at the contact center server 40 has previously registered its IP address at the SIP registrar 46. In this example, the URI of the contact center server is shown as ccA@cc.nortelnetworks.com in FIG. 4 and the associated SIP address of record is service@cc.nortelnetworks.com.

When the contact center server 40 receives the SIP INVITE message from the customer 47, it optionally provides additional contact center services as part of the contact center entry system. As mentioned above, this is achieved using the SIP media server 43 to which the customer is connected if these services are to be provided.

The contact center server 40 next selects an appropriate agent 42 to handle the incoming contact. This is achieved using any suitable method as known in the art. The selected agent is then preferably reserved (although this is not essential) as known in the art. A unique transaction identifier or trouble ticket number is then assigned to the incoming contact using any suitable method. The unique identifier, in this example, a SIP URI, is then dynamically created by the contact center server 40 or other suitable entity. In this example, the unique identifier is created as:
Ticket12345abcde10122003200823@cc.nortelnetworks.com The selected contact center agent 42 is then registered against this SIP URI at the registrar 46. This involves adding the agent address, AgentA@cc.nortelnetworks.com as a contact header address binding.

The customer is then connected to the selected agent 42 by re-directing the customer SIP session from the media server 43 to Ticket12345abcde10122003200823@cc.nortelnetworks.com which is now the intermediate address for the agent. This redirection is done using the redirection server 45 or alternatively the customer SIP session is proxied to the Agent using proxy 45.

Details of the Unique Identifier
Ticket12345abcde10122003200823@cc.nortelnetworks.com are then provided to the customer 47 by the Agent 42 using the SIP session between the customer and agent. The customer is asked to use this unique identifier when re-contacting the Agent about the same transaction. In that case, the customer calls Ticket12345abcde10122003200823@cc.nortelnetworks.com and reaches the agent directly. In contrast, without the present invention, the customer needs to call service@cc.nortelnetworks.com and enter the contact center via the usual entry system.

When the Customer Calls Ticket12345abcde10122003200823@cc.nortelnetworks.com a SIP INVITE message is issued from the customer to the contact center server 40 of the following form:

INVITE sip:Ticket12345abcde10122003200823@cc.nortelnetworks.com SIP/2.0
Via: SIP/2.0/UDP public.com;branch=z9hG4bKnashds8
Max-Forwards: 70
To: TroubleTicket<sip:Ticket12345abcde10122003200823@cc.nortelnetworks.com>
From: customer<sip: customer@public.com>; tag=1928301774
Call-ID: a84b4c76e66710
CSeq: 314159 INVITE
Contact: <sip:customer@public.com>
Content-Type: application/sdp
Content-Length: 142

Because AgentA@cc.nortelnetworks.com is the only binding for the address Ticket12345abcde10122003200823@cc.nortelnetworks.com then the call is routed directly to the agent's desktop 42 either by proxy or redirect services (see 45 in FIG. 4). In this way details of the agent's actual SIP URI are not disclosed to the customer.

The registration made at the registrar 46 between the agent's actual SIP URI and the unique identifier Ticket12345abcde10122003200823@cc.nortelnetworks.com needs to be maintained. That is, this association will expire after a specified time unless messages are sent to the registrar 46 to maintain it. Any suitable entity such as the contact center server 40 or the agent terminal 42 is arranged to do this.

When the trouble ticket is closed the registration made at the registrar 46 between the agent's actual SIP URI and the unique identifier is broken or cancelled. This is done in any suitable manner. For example, the contact center server 40 (or other suitable entity) issues a register request for the address of record binding to AgentA@cc.nortelnetworks.com with an expires Contact header value of zero. This cancels the association between the trouble ticket number and the agent but allows the trouble ticket number to continue to exist. In that case, if the customer calls again using the unique identifier, the customer will receive an error message from the proxy or redirect server. Optionally, the customer call is also redirected to the contact center to enter via the normal entry process. In other situations, it may be preferred to cancel the trouble ticket number as well the association between the unique identifier and the agent. In that case, the trouble ticket would advantageously be removed from any database associated with the contact center, in order that trouble ticket number can be reused. Another method of cancelling the association between the agent and the unique identifier involves simply stopping to send maintenance messages to the Registrar such that the association eventually times out.

As mentioned above the present invention enables a customer or other end user to by-pass the contact center entry system and contact a specified agent directly. In a preferred embodiment, the contact center itself is still able to identify when one of its associated agents receives a direct contact that has bypassed the usual entry system. Thus the contact center is preferably able to identify all stages of interaction between the agent and customer that result from the direct contact. For example, that the agent has received a direct contact, is active in dealing with the direct contact, has released the call or made other actions relevant to the agent customer interaction.

Any range or device value given herein may be extended or altered without losing the effect sought, as will be apparent to the skilled person for an understanding of the teachings herein.

The invention claimed is:

1. In a contact center comprising a plurality of agents and an entry processor arranged to receive contacts and subject them to an entry process such that they are distributed amongst the agents, a method of enabling an end user to contact one of the plurality of agents directly thereby bypassing at least part of said entry process, said method comprising the steps of:
   (i) generating a session initiation protocol (SIP) address of record comprising no information that provides to the end user contact details of an agent selected by the entry processor to receive a contact from said end user;
   (ii) associating the SIP address of record with the selected agent;
   (iii) providing the end user with the SIP address of record such that the end user is able to use the SIP address of record to subsequently to contact the selected agent directly thereby bypassing at least part of said entry process.

2. A method as claimed in claim 1 which further comprises cancelling the association between the SIP address of record and the selected agent in the event that one or more pre-specified conditions are met.

3. A method as claimed in claim 2 wherein said pre-specified conditions for cancelling the association between the selected agent and the SIP address of record are selected from: a time delay, an indication from the selected agent, an indication from the end user and an indication from a supervisor.

4. A method as claimed in claim 1 wherein said step of associating the SIP address of record with the selected agent comprises making a registration at a registration server.

5. A method as claimed in claim 1 wherein said step of associating the SIP address of record with the selected agent further comprises associating the SIP address of record with a transaction identifier.

6. A method as claimed in claim 1 wherein the SIP address of record is generated using a transaction identifier.

7. A method as claimed in claim 1 which further comprises assigning a transaction identifier to an incoming contact.

8. A session initiation protocol enabled contact center comprising:
   (i) an entry processor arranged to receive contacts and subject them to an entry process such that they are distributed amongst a plurality of agents;
   (ii) an input for generating a SIP address of record comprising no information that provides to an end user contact details of an agent selected by the entry processor to receive a contact from said end user;
   (iii) an output arranged to issue instructions to associate the SIP address of record with said selected agent;
   (iv) an output arranged to provide an end user with the SIP address of record; such that the end user is able to use the SIP address of record to a subsequently to contact the selected agent directly thereby bypassing at least part of said entry process.

9. A contact center as claimed in claim 8 which further comprises a processor arranged to cancel the association between the SIP address of record and the selected agent in the event that one or more pre-specified conditions are met.

10. A contact center as claimed in claim 8 wherein the instructions to associate the SIP address of record and the selected agent comprise instructions to make a registration at a registration server.

11. A contact center as claimed in claim 8 wherein said SIP address of record is generated using a transaction identifier.

12. A communications network comprising a contact center as claimed in claim 8.

13. A session initiation protocol enabled contact center comprising:
   a) an entry means for receiving contacts and subjecting them to an entry process such that they are distributed amongst a plurality of agents;
   b) an input means for generating a SIP address of record comprising no information that provides to an end user contact details of an agent selected by the entry processor to receive a contact from said end user;
   c) an output means for issuing instructions to associate the SIP address of record with said selected agent; and
   d) means for providing an end user with the SIP address of record; such that the end user is able to use the SIP address of record subsequently to contact the selected agent directly thereby bypassing at least part of said entry process.

14. An entry processor for use with a contact center comprising a plurality of agents, said entry processor being arranged to receive contacts and subject them to an entry process such that they are distributed amongst the agents, said entry processor comprising:
   a) an input for generating a SIP address of record comprising no information that provides to an end user contact details of an agent selected by the entry processor to receive a contact from said end user;
   b) an output arranged to issue instructions to associate the SIP address of record with said selected agent;
   c) an output arranged to provide an end user with the SIP address of record; such that the end user is able to use the SIP address of record subsequently to contact to the selected agent directly thereby bypassing at least part of said entry process.

\* \* \* \* \*